Figure 1:
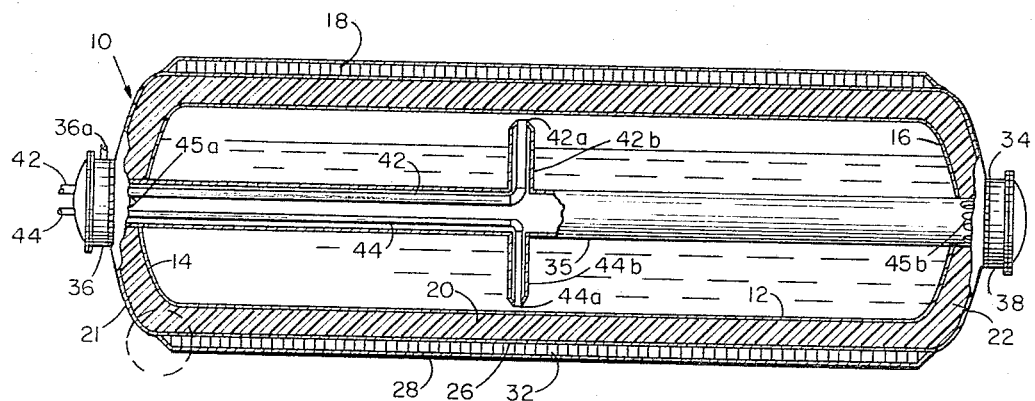

Feb. 28, 1967    P. D. STELTS ET AL    3,306,059

CRYOGENIC STORAGE APPARATUS

Filed June 15, 1965

INVENTORS.
PHILIP D. STELTS
BY   EDMUND M. FLOUNDERS
RICHARD G. CLARK

United States Patent Office 3,306,059
Patented Feb. 28, 1967

3,306,059
CRYOGENIC STORAGE APPARATUS
Philip D. Stelts, Center Valley, Richard G. Clark, Emmaus, and Edmund M. Flounders, Pottstown, Pa., assignors, by mesne assignments, to the United States of America as represented by the United States Atomic Energy Commission
Filed June 15, 1965, Ser. No. 464,252
2 Claims. (Cl. 62—45)

The present invention relates to lightweight cryogenic storage apparatus and more particularly to lightweight cryogenic storage apparatus of honeycomb wall construction.

With the development of nuclear fission reactors of compact and mobile design, efforts have been directed toward the problem of finding ways of utilizing this type of power source under mobile conditions where energy requirements fluctuate widely and rapidly, and where energy needs must be filled while the reactor may be temporarily out of normal operation. The so-called energy depot concept has been proposed by which the energy from the fission process in the reactor is used to synthesize chemical fuels which can be expended as needed, and stored for use when there is not sufficient reactor power being developed. Under one such proposed arrangement, water found locally is purified and electrolyzed, using electricity produced by the mobile reactor power plant. Hydrogen is produced and then liquefied to facilitate storage and distribution when and where needed. The hydrogen could then be combined with oxygen in a fuel cell to produce electrical energy or could be utilized in any of the more conventional arrangements for burning or oxidizing the fuel. In any event, however, it is necessary to store the liquefied hydrogen under conditions which would make it possible to move it conveniently and safely, as well as economically. The conditions under which the hydrogen is stored and moved would, of course, not always be ideal, so that severe storage problems are introduced as a result of this consideration.

Based upon the usual requirements of economic cryogenic liquid storage, cylindrical tanks provided with so-called super-insulation and vacuum jackets, ordinarily referred to as Dewars, would be necessary. However, conventional Dewars designed for stationary use are excessively heavy due to the relatively thick solid walls comprising both the inner vessel and the vacuum jacket. Those designed for mobile use as on trailer trucks and railroad cars use suspension systems which are not sufficiently rugged for military use which involves off-the-road mobility and, perhaps, air-drop.

By the present invention it has been made possible to so improve the strength and rigidity of the Dewar while substantially reducing its weight, that a large and unexpected benefit results in the manufacture and use of the Dewar in the application as described above. This is accomplished in accordance with this invention by the use of aluminum alloy material for the manufacture of the pressure vessel and of a lightweight aluminum-honeycomb material to form the vacuum jacket surrounding the vessel. The honeycomb provides the structural strength necessary for the mobile application as described above without the necessity of adding bulk which would be required by conventional solid-wall methods. Incorporating these features in the design of a typical vessel results in reducing the vessel weight by a factor of 2–3 as compared with conventional vessel construction. In addition, an improved piping structure results in exceptional compactness and tends to reduce heat leak along the piping.

It is thus a first object of the invention to provide a liquid hydrogen storage container of improved design.

Another object is a cryogenic storage container of reduced weight and increased strength.

A further object of the invention is a Dewar of improved compactness and mobility.

Yet another object is to provide an improved piping system.

Figure 2:
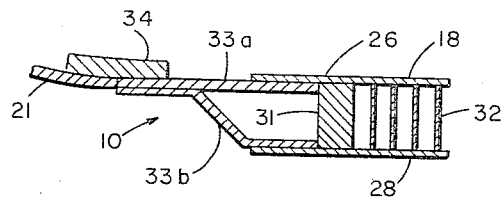

Other objects and advantages of this invention will hereinafter become evident from the following description taken with the accompanying drawing in which:

FIG. 1 is an elevation view in section of a preferred embodiment of this invention; and FIG. 2 is a detail of the joint between the jacket and a hemispherical end wall.

Referring to the drawing, there is illustrated a container or Dewar 10 for storing liquefied gasses such as hydrogen at cryogenic temperatures and pressures in accordance with this invention. Container 10 consists of an inner cylindrical vessel 12 with hemispherical ends 14 and 16 surrounded by and spaced therefrom by an outer jacket 18 which is cylindrical in its intermediate portion and is closed off by a pair of hemispherical ends 21 and 22. Vessel 12 is made from a suitable lightweight high strength metal such as, for example, any known heat treatable aluminum alloy. The specific type or composition of lightweight metal does not form a part of this invention.

The annular space between vessel 12 and jacket 18 is filled with insulating material 20 such as described, for example, in U.S. Patent 3,018,016 or 3,007,596, and is maintained at a vacuum as in any Dewar.

Jacket 18 in its cylindrical portion is of honeycomb construction and consists of a cellular core 32 brazed or otherwise bonded to inner and outer skins 26 and 28, respectively. This honeycomb is prepared from a suitable aluminum alloy. Such a honeycomb material is available commercially and one such material is known as Bondolite, a registered trademark of the Goodyear Aircraft Corporation.

Referring to FIG. 2, it will be seen that the honeycomb portion of jacket 18 is connected along one edge by welding or other suitable means to end wall 21. Inner and outer skins 26 and 28 of jacket 18 support a plug 31 terminating the honeycomb core 32 and a pair of transition sheets 33a and 33b which come together and are connected to end wall 21. A back-up strip 34 insures the reliability of the joint. A similar arrangement joins the opposite end of the honeycomb with end wall 22.

Inner vessel 12 is supported entirely by a cylindrical, evacuated support tube 35 the ends of which extend beyond the vessel by way of end cap assemblies 36 and 38 mounted on hemispherical ends 21 and 22 of outer jacket 18. End cap assemblies 36 and 38 would contain the usual radiation shields (not shown) while cap assembly 36 is provided with an evacuation line 36a which is connected to the interior of support tube 35. An important feature of the container construction is the use of the evacuated support tube 35 to carry into vessel 12 a vent line tube 42, a liquid fill line tube 44, and provision for the evacuation of insulation space surrounding vessel 12. Tube 42 terminates in a radial tubular member 42a extending almost to the top of vessel 12. Similarly, tube 44 terminates in a radial tubular member 44a extending almost to the bottom of vessel 12. Tubular members 42a and 44a are surrounded by evacuated sleeves 42b and 44b, respectively, communicating with the interior of evacuated tube 35 to minimize heat leak into container 10. This construction in which the vent and inlet pipes enter the container through an end cap assembly and the central support tube differs over the usual arrangement wherein these tubes enter the container through a side wall. A substantial saving by way of lowering heat leak through his passage into the interior of the inner vessel is the beneficial result of the arrangement described above.

Support tube 35 is provided with openings 45a and 45b communicating as shown with the evacuated insulation space between jacket 18 and inner vessel 12. Thus evacuation line 36a would be connected to pumping apparatus (not shown) which would be operated to evacuate the mentioned insulating space as well as support tube 35.

The weight of a typical tank made in accordance with this invention is 80 lbs. which compares with 150–200 lbs. for a conventionally constructed storage vessel of the same size. In addition, the container of this invention is far more rugged than the conventional container, being capable of sustaining, for example, a 10 g load in any direction and therefore is far more suitable for mobile use than the conventional tanks.

It is thus seen that there has been provided a unique cryogenic liquid storage apparatus of increased mobility and decreased weight. While only a preferred embodiment of the invention has been described it is understood that many variations thereof may be made without departing from the spirit of this invention. Thus this invention is not to be limited by the embodiment hereinabove described but is to be defined only by the scope of the appended claims.

We claim:
1. Lightweight cryogenic liquid storage apparatus comprising:
    (a) a generally cylindrical vessel of lightweight metal containing liquefied gas at cryogenic pressure and temperature conditions and sealed at both ends;
    (b) jacket means surrounding said vessel forming a vacuum space between said vessel and said jacket means, said jacket means including a honeycomb wall portion of lightweight metal construction;
    (c) insulating material disposed in the space between said vessel and said jacket means;
    (d) tubular means extending axially through said vessel for supporting the latter at the ends thereof, said tubular means having openings communicating with said space to permit the evacuation thereof;
    (e) pipe means extending into said vessel by way of said tubular means for permitting liquid flow into and out of said vessel and the venting of vapors within said vessel; and
    (f) cap means to close off the ends of said tubular means extending out of said vessel and to attach said tubular means to said jacket means.

2. The apparatus of claim 1 in which said pipe means includes a pair of tubes extending through said cap means into said tubular means, and tubes radially extending from said pair of tubes into said vessel, said radially extending tubes being provided with vacuum sleeves communicating with the interior of said tubular means to reduce heat leak into said vessel.

References Cited by the Examiner

UNITED STATES PATENTS

| | | | |
|---|---|---|---|
| 2,512,875 | 6/1950 | Reynolds | 165—136 |
| 2,744,042 | 5/1956 | Pace | 220—9 |
| 2,962,811 | 12/1960 | Herbert | 165—136 |
| 2,998,708 | 9/1961 | Skinner | 62—45 |
| 3,107,498 | 10/1963 | Messer | 62—45 |
| 3,136,135 | 6/1964 | Rigby et al. | 62—45 |

FOREIGN PATENTS

| | | |
|---|---|---|
| 662,356 | 4/1963 | Canada. |
| 1,162,473 | 4/1958 | France. |

LLOYD L. KING, *Primary Examiner.*